Dec. 16, 1924.

N. C. JOHNSON 1,519,311

RETICULATED OR CELLULAR CEMENT OR THE LIKE PRODUCT
AND METHOD OF MAKING SAME
Filed Jan. 21, 1922

Inventor
Nathan Clarke Johnson
By his Attorneys
Ward Crosby & Smith

Patented Dec. 16, 1924.

1,519,311

UNITED STATES PATENT OFFICE.

NATHAN CLARKE JOHNSON, OF ENGLEWOOD, NEW JERSEY.

RETICULATED OR CELLULAR CEMENT OR THE LIKE PRODUCT AND METHOD OF MAKING SAME.

Application filed January 21, 1922. Serial No. 530,818.

*To all whom it may concern:*

Be it known that I, NATHAN CLARKE JOHNSON, a citizen of the United States, and a resident of Englewood, in the county of Bergen and State of New Jersey, have invented certain new and useful Improvements in Reticulated or Cellular Cement or the like Product and Methods of Making Same, of which the following is a specification.

This invention relates to reticulated or cellular cement or the like product and method of making same. By the word "cement" as herein used I mean cements or the like substances capable of being mixed with other ingredients so as to be molded or formed into suitable shapes and then allowed to "set" into a rigid structure, such substances for example, as Portland cement, magnesium oxychloride cement and other known substances which will act similarly for the purpose of being molded and subsequently setting to produce a rigid structure having the general characteristics hereinafter referred to.

This invention has for its object the production of a durable, cheap, light weight cement or the like product or structure having relatively high unit strength, low heat conductivity and high fire-resisting qualities suitable for various constructional, ornamental and other uses.

In one aspect the invention comprises a rigid cellular or reticulated cement or the like structure or product, i. e., one having throughout its body voids, small cell-like pockets or cavities containing fibrous nodules such for example as nodules of paper, paper pulp, or cotton linters, etc.

In another aspect the invention comprises a process for producing said product.

As the product may be worked by saws and other tools, it may also be used as a substitute for wood—lumber for many purposes. Decorative effects are also possible with it; for such purposes, for example, as friezes, panels, tiles, wainscotings or the like. Because of its light weight and fireproof quality, it may also be used wholly or in part for cast floor constructions used in modern methods of building or as unit wall blocks or partition blocks, or for roof slabs, either with or without steel mesh or rods for reinforcing.

The invention will be more readily understood and further objects and advantages will more fully appear from the following description taken in connection with the accompanying drawings illustrating the present preferred form of the product.

Figure 1:
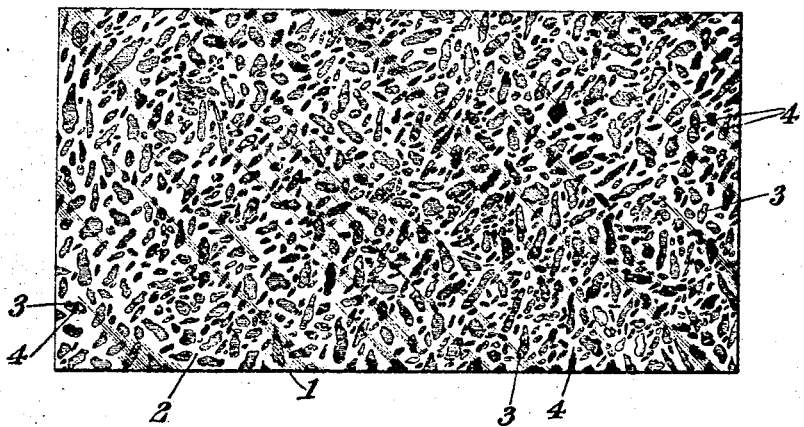
Figure 2:
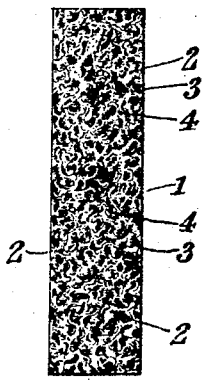

In the drawings, Fig. 1 is a top view of a length of slab embodying the invention; and Fig. 2 is an end view of a piece broken across.

Referring to the drawings, 1 is a piece of the product embodying the invention in the form of a piece of a slab. It consists of the rigid light cellular or reticulated cement mass 2 with cells, pockets or interstices 3 formed by and containing fibrous nodules 4, in this instance made of waste newspaper pulp.

In producing this reticulated cellular mass according to my preferred process, suitable water-swollen fibre nuclei, such for example as thoroughly wet news-print pulp or the like waste or low value fibrous material, or cotton linters, in the form of nodules or pillets, preferably agglomerated by some coagulant such as alum, into swollen tapioca-like particles, are employed as an aggregate or bulking medium. To this mass is added the cementitious material either dry or as a grout, and the whole mixed to a mass of uniform consistency. With Portland cement or other water-reacting substances the dry cement powder alone may be used, but with other cements, such as magnesium oxychloride cement, the cementitious material must be either mixed with its reacting fluid as a grout before mixing with the fibrous aggregate, or else the reacting fluid should be mixed into the fibrous agglomerates and their contained and entrained fluids.

The mixture, by way of example, may contain the cement and the wetted pulp or nodules in the proportion by volume of 1:3. The water content of the wetted paper pulp nodules is usually about 93% by weight, substantially all of which is ultimately evaporated from the product so that relatively large interstices or voids are obtained with a very small ultimate weight of nodules, which means light weight in the final product.

When the mixture is molded in forms or is pressed from dies, it sets and hardens. On evaporation these nodules lose their water, and incident to this process and by reason of the water content in the nodules, supply to Portland cement (where such a cement is used) the moist curing well known to be essential to the development of the highest values, and this moist curing is carried on throughout the structure due to the distribution of the nodules therein.

The nodules have such a great affinity or capacity for water that their presence minimizes the danger of weakening the cement by an excessive use of water. The nodules will absorb the water to their full capacity, giving up only so much water to the cement as the latter demands for proper chemical action and setting. When the mass or product has hardened or set to a satisfactory degree, the product will be found to be a light weight fireproof structure composed of a reticulated or cellular mass with distinct pockets having in its interstices or pockets fibrous nodules or aggregates. On drying, these nodules of fibre weigh so little as to give a final product weighing but slightly more than the cement present in a given volume of the product, although the mass is of greatly increased volume or bulk over that which would be obtained were the cement to set and harden as an unreticulated solid. Ordinarily, in ordinary temperature and atmospheric conditions, it takes from two weeks to a month for the product to substantially dry out to its ultimate light weight, the time depending, of course, upon the shape, form and dimensions of the structure or product. But it will be understood that the product sets and becomes rigid in a relatively short period of time such as is customary in cement structures.

If desired, sand may be added to the cement either before or during mixing, in which case the reticulated mass will be composed of sand, cement fibrous nodules and water.

An added advantage is also gained if with the use of Portland cement as a binding material, a small quantity of sodium silicate is added to the wet fibrous pulp, preferably during its pulping process, so that the silicate in solution shall lie throughout the fibres composing the agglomerations or nodules. This silicate performs a triple function, in that it tends to neutralize the paper pulp which frequently contains tannin, lignin and other substances which would otherwise slow down the "set" and impair the strength of the product. It also reacts with the lime salts liberated on the wetting of the cement, thus casting about each nodule a casing of insoluble silicate of lime, thus helping to preserve its nodule form. Secondly, as hydration goes on during setting and thereafter, with further liberation of lime salts, these salts, by seepage, transfusion or diffusion into the interior of each nodule, contact with the sodium silicate in the fibres of the nodule, thus casting about each fibre a precipitate of calcium silicate, thus rendering the completed and set mass fireproof even under intense heat.

A further advantage accruing to this product is that the fibre nodules or agglomerations may be dyed or colored in any manner desired, either before or after incorporation with the cement, and by this means stratifications of surface and of body in suitable colors may be readily made in imitation of natural stones or effects even excelling them in variety and beauty, but at a much lower cost than such stones, and with the further advantage that the product is not worked with difficulty. The product may be readily sawed, drilled, turned, nailed, or otherwise worked.

I am aware of the fact that it has been proposed to make composition plates by thoroughly grinding together or otherwise mixing cement with ground up fibrous materials such as wood cellulose, straw cellulose, etc., with or without other materials such as zinc and potassium or sodium silicate, getting the same in a plastic mass and therefrom molding such plates, and it has also been proposed to make a composition pavement by mixing such fibrous material with iron filings dampened with water, and incorporate the mixture with cement to make a more yieldable composition suitable for roadbeds, but my composition and method differ from these in that I make use of water soaked nodules or pillets which, by reason of their formation and considerable swelling when soaked with water, form distinct pockets or cells throughout the mass by reason of the area they occupy and which, when they dry out, leave pockets or cells of relatively large area as compared with the mass of the dried paper they contain, thus making a very light composition of the character desired, and one having desirable markings, as contrasted with the more uniform consistency and fibrous nature of the known compositions.

It will be understood by those skilled in the art, after understanding my invention, that the mass may be cast about any reinforcing devices such as is well understood in the art, and it will be further understood that where in the appended claims I use the word "cement," I do so for the sake of brevity, and that I mean thereby, unless otherwise specifically limited, to include the use of various cements capable of setting as aforesaid, with or without the use of other substances such as sand or the like.

Having thus described my invention, what

I claim as new and desire to secure by Letters Patent, is:

1. As a product, a rigid reticulated cement structure having pockets or cells with fibrous nodules therein.

2. As a product, a rigid reticulated cement structure having pockets or cells with nodules of fibrous pulp.

3. As a product, a rigid reticulated Portland cement structure having pockets or cells with fibrous nodules therein.

4. As a product, a rigid reticulated cement structure having in its surface pockets or cells with stained fibrous nodules.

5. As a product, a rigid reticulated cement structure having pockets or cells with fibrous nodules containing a coagulant.

6. As a product, a rigid reticulated Portland cement structure having pockets or cells with fibrous nodules therein containing calcium silicate.

7. As a product, a rigid reticulated Portland cement structure having pockets or cells with fibrous nodules therein coated with silicate of lime.

8. As a product, a rigid reticulated cement structure having a mottled decorative surface comprising portions of cement and portions of fibrous nodules, the surface being colored with coloring material having a greater affinity for the fibrous material than for the cement to contrast the respective portions.

9. Method of producing a rigid reticulated cement structure with distinct pockets which comprises making a mixture containing cement and fibrous water soaked nodules with sufficient water to form a moldable mass, then allowing the mass to set and the nodules to dry.

10. Method of producing a rigid reticulated cement structure with distinct pockets which comprises wetting fibrous pulp and forming swollen nodules, then mixing the wetted nodules with cement to form a moldable mass, and then allowing the mass to set and dry.

11. Method of producing a rigid reticulated cement structure which comprises thoroughly wetting paper pulp and forming swollen nodules, mixing the wet nodules with Portland cement and sodium silicate to form a moldable mass, and then allowing the mass to set and the bulk of the moisture to dry out of the nodules.

12. Method of producing a rigid reticulated cement structure which comprises wetting fibrous nodule forming material with water and treating with alum to form swollen nodules, mixing the wet nodules with cement to form a moldable mass, and then allowing the mass to set and the bulk of the moisture to dry out of the nodules.

13. Method of producing a rigid reticulated cement structure which comprises thoroughly wetting paper pulp and forming swollen nodules thereof, adding a neutralizing agent to the wet pulp, mixing the wet nodules with Portland cement to form a moldable mass, and then allowing the mass to set and the bulk of the moisture to dry out of the nodules.

Signed at New York, in the county of New York and State of New York, this 18th day of January, A. D. 1922.

NATHAN CLARKE JOHNSON.